United States Patent
Cheng et al.

(10) Patent No.: US 8,743,577 B2
(45) Date of Patent: Jun. 3, 2014

(54) METHOD AND APPARATUS FOR HIGH EFFICIENCY AC/DC CONVERSION OF LOW VOLTAGE INPUT

(75) Inventors: Shuo Cheng, Gainesville, FL (US); Yuan Rao, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 350 days.

(21) Appl. No.: 12/950,564

(22) Filed: Nov. 19, 2010

(65) Prior Publication Data

US 2011/0121659 A1     May 26, 2011

Related U.S. Application Data

(60) Provisional application No. 61/262,803, filed on Nov. 19, 2009.

(51) Int. Cl.
  *G05F 3/02*      (2006.01)
  *H02M 7/00*      (2006.01)
  *H02M 7/217*     (2006.01)
  *H02M 7/68*      (2006.01)

(52) U.S. Cl.
  USPC .................. 363/127; 363/89; 363/59; 363/60; 363/61; 327/538

(58) Field of Classification Search
  USPC ............... 363/127, 84, 44, 89, 59, 60, 61, 62; 327/538, 541, 543, 493
  See application file for complete search history.

(56) References Cited

U.S. PATENT DOCUMENTS

| | | | | |
|---|---|---|---|---|
| 5,182,702 A | * | 1/1993 | Hiramatsu et al. | 363/132 |
| 5,262,999 A | | 11/1993 | Etoh et al. | |
| 5,745,357 A | * | 4/1998 | Matsumoto | 363/84 |
| 5,780,899 A | | 7/1998 | Hu et al. | |
| 6,060,943 A | * | 5/2000 | Jansen | 327/538 |
| 6,100,653 A | * | 8/2000 | Lovell et al. | 315/307 |
| RE37,593 E | | 3/2002 | Etoh et al. | |

(Continued)

FOREIGN PATENT DOCUMENTS

| | | |
|---|---|---|
| WO | WO-95-19046 A1 | 7/1995 |
| WO | WO-2004-006421 A1 | 1/2004 |
| WO | WO-2009-028954 A1 | 3/2009 |

OTHER PUBLICATIONS

Yat-Hei Lam, An energy-adaptive MPPT Power Management Unit for Micro-Power Vibration Energy Harvesting, 2008, IEEE, pp. 2570-2573.*

(Continued)

*Primary Examiner* — Timothy J Dole
*Assistant Examiner* — Zekre Tsehaye
(74) *Attorney, Agent, or Firm* — Saliwanchik, Lloyd & Eisenschenk (57) ABSTRACT

Embodiments of the subject invention relate to a method and apparatus for providing a low-power AC/DC converter designed to operate with very low input voltage amplitudes. Specific embodiments can operate with input voltages less than or equal to 1 V, less than or equal to 200 mV, and as low as 20 mV, respectively. Embodiments of the subject low-power AC/DC converter can be utilized in magnetic induction energy harvester systems. With reference to a specific embodiment, a maximum efficiency of 92% was achieved for a 1 V input, and efficiencies exceeding 70% were achieved for a 200 mV input. A specific embodiment functioned properly when connected to a magnetic energy harvester device operating below 200 mV input.

52 Claims, 9 Drawing Sheets

(56) References Cited

U.S. PATENT DOCUMENTS

| | | | |
|---|---|---|---|
| 6,421,261 B1* | 7/2002 | Fujisawa et al. | 363/127 |
| 6,967,522 B2 | 11/2005 | Chandrakasan et al. | |
| 6,999,327 B2* | 2/2006 | Smith et al. | 363/60 |
| 7,558,083 B2 | 7/2009 | Schlecht | |
| 7,706,152 B2 | 4/2010 | Shen et al. | |
| 2007/0211498 A1 | 9/2007 | Van Casteren | |

OTHER PUBLICATIONS

E. Dallago, Active Self Supplied AC-DC Converter for Piezoelectric Eneergy Scavenging Systems With Supply Independent Bias, 2008, IEEE, pp. 1448-1451.*
Bowers, B.J., et al., "Spherical, Rolling Magnet Generators for Passive Energy Harvesting from Human Motion," *Journal of Micromechanics and Microengineering*, Aug. 2009, Article No. 094008, vol. 19, No. 9.
Chao, L., et al., "Vibration Energy Scavenging and Management for Ultra Low Power Applications," *Proceedings of the 2007 International Symposium on Low Power Electronics and Design*, Aug. 27-29, 2007, Portland, OR, pp. 316-321.
Cheng, S., et al., "A Bridge Voltage Doubler AC/DC Converter for Low-Voltage Energy Harvesting Applications," 9th International Workshop on Micro and Nanotechnology for Power Generation and Energy Conversion Applications (PowerMEMS 2009), Dec. 1-4, 2009, Washington, DC, pp. 25-28.
Ghovanloo, M., et al., "Fully Integrated Wideband High-Current Rectifiers for Inductively Powered Devices," *IEEE Journal of Solid-State Circuits*, Nov. 2004, pp. 1976-1984, vol. 39, No. 11.
Guan, M.J., et al., "On the Efficiencies of Piezoelectric Energy Harvesting Circuits Towards Storage Device Voltages," *Smart Materials and Structures*, Apr. 2007, pp. 498-505, vol. 16, No. 2.
Lam, Y.-H., et al., "Integrated Low-Loss CMOS Active Rectifier for Wirelessly Powered Devices," *IEEE Transactions on Circuits and Systems II: Express Briefs*, Dec. 2006, pp. 1378-1382, vol. 53, No. 12.
Lefeuvre, E., et al., "Buck-Boost Converter for Sensorless Power Optimization of Piezoelectric Energy Harvester," *IEEE Transactions on Power Electronics*, Sep. 2007, pp. 2018-2025, vol. 22, No. 5.
Lehmann, T., et al., "On-Chip Active Power Rectifiers for Biomedical Applications," *IEEE International Symposium on Circuits and Systems*, May 23-26, 2005, pp. 732-735, vol. 1.
Matsukawa, T., et al., "Application of SiC-Based Power Element to High Current AC/DC Converter System," *Fusion Engineering and Design*, Sep. 2003, pp. 1155-1158, vol. 66-68.
Maxim, MAX9119 datasheet, http://datasheets.maxim-ic.com/en/ds/MAX9117-MAX9120.pdf.
Mitcheson, P.D., et al., "Energy Harvesting From Human and Machine Motion for Wireless Electronic Devices," *Proceedings of the IEEE*, Sep. 2008, pp. 1457-1486, vol. 96, No. 9.
Ottman, G.K., et al., "Adaptive Piezoelectric Energy Harvesting Circuit for Wireless Remote Power Supply," *IEEE Transactions on Power Electronics*, Sep. 2002, pp. 669-676, vol. 17, No. 5.
Peters, C., et al., "A CMOS Integrated Voltage and Power Efficient AC/DC Converter for Energy Harvesting Applications," *Journal of Micrornechanics and Microengineering*, Oct. 2008, Article No. 104005, vol. 18, No. 10.
Texas Instruments, "Energy harvesting becomes reality with AdaptivEnergy's wireless, remote sensing solution based on TI ultra-low power technology," Texas Instruments NewsCenter, Aug. 19, 2008, http://newscenter.ti.com/Blogs/newsroom/archive/2008/08/19/energy-harvestind-becomes-reality-with-adaptivenergy-s-wireless-remote-sensing-solution-based-on-ti-ultra-low-power-technology-sc08102.aspx.
Vullers, R.J.M., et al., "Micropower Energy Harvesting," *Solid-State Electronics*, Jul. 2009, pp. 684-693, vol. 53, No. 7.

* cited by examiner

METHOD AND APPARATUS FOR HIGH EFFICIENCY AC/DC CONVERSION OF LOW VOLTAGE INPUT

CROSS-REFERENCE TO RELATED APPLICATION(S)

The present application claims the benefit of U.S. Provisional patent application No. 61/262,803, filed Nov. 19, 2009, which is hereby incorporated by reference herein in its entirety, including any figures, tables, or drawings.

BACKGROUND OF INVENTION

Efficient AC/DC rectification of low voltages is important for the realization of fully-functional vibrational energy harvesting systems. Microwatt to milliwatt motional/vibrational energy harvesting systems can utilize low-power power management circuits. Vibrational energy harvesters can utilize ac/dc converter circuits that can operate at low input power and low voltage with acceptable efficiency (>80%). Attention has been given to circuits for piezoelectric harvesters [Ottman, G. K., Hofmann, H. F., Bhatt, A. C. and Lesieutre, G. A., 2002, Adaptive piezoelectric energy harvesting circuit for wireless remote power supply, *IEEE Trans. Power Electronics*, 17, 669-76; Guan, M. J. and Liao, W. H., 2007, On the efficiencies of piezoelectric energy harvesting circuits towards storage device voltages, *Smart Mater. Struct.*, 16, 498-505; Lefeuvre, E., Audigier, D., Richard, C., Guyomar, D. K. 2007, Buck-Boost converter for sensorless power optimization of piezoelectric energy harvester, *IEEE Trans. Power Electronics*, 22, 2018-25], whose output voltage level is generally higher (typically >1 V) than similarly sized magnetic harvesters (typically <1 V). Accordingly, there is a lack of suitable low-voltage rectification solutions for magnetically based vibrational energy harvesting systems [Mitcheson, P. D., Yeatman, E. M., Rao, G. K., Holmes, A. S., and Green, T. C. 2008, Energy harvesting from human and machine motion for wireless electronic devices, *Proceedings of the IEEE*, 96, 1457-86].

Passive junction-based semiconductor diode bridges are generally not suitable for input voltage levels under 0.5 V, due to the forward-bias voltage drop associated with the diodes. Active MOS-based synchronized rectification is possible, where the rectification is implemented by controlling the conduction of MOSFET with a clock signal that is in phase with the input signal [Ghovanloo, M. and Najafi, K. 2004, Fully integrated wideband high-current rectifiers for inductively powered devices, *IEEE J. Solid-State Circuits*, 39, 1976-84]. Active MOS-based synchronized rectification typically utilizes a drive voltage (control signal) that is higher than the threshold voltage of the MOSFET (typically ~0.4 V). In order to make available this drive voltage, complicated driving circuitry is commonly utilized.

Alternatively, in an attempt to avoid the inherent forward-bias voltage drop of semiconductor diodes, active diodes have been used in wireless power transmission [Lam, Y-H, Ki, W-H and Tsui, C-Y, 2006, Integrated low-loss CMOS active rectifier for wirelessly powered devices, *IEEE Trans. Circuits Systems-II: Express Briefs*, 53, 1378-82] and medical areas [Lehmann, T. and Moghe, Y., 2005, On-chip active power rectifiers for biomedical applications, *IEEE Intl. Symp. Circuits Sys. ISCAS*, 2005, 732-5]. Active diode can refer to a comparator-controlled switch that replaces junction-based diode. Recently, a combination of a synchronized rectifier and an active diode for energy harvester application has been investigated [Peters, C., Spreemann, D., Ortmanns, M. and Manoli, Y. 2008, A CMOS integrated voltage and power efficient AC/DC converter for energy harvesting applications, *J. Micromech. Microeng.*, 18, 104005-13]. However, this approach can suffer from the same voltage threshold limit of other self-driven synchronized rectifiers, and the minimum rectifiable input voltage was reported in the Peters et al. reference to be only 1.25 V.

Accordingly, there is a need in the art for a method and apparatus for high efficiency AC/DC conversion of low voltage inputs.

BRIEF SUMMARY

Figure 7:
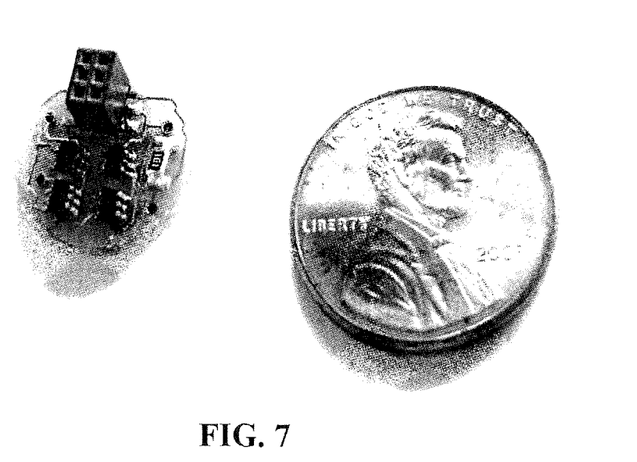
FIG. 7 shows a top view of a printed circuit board layout implementing a converter in accordance with an embodiment of the subject invention.

Embodiments of the subject invention relate to a method and apparatus for providing a low-power AC/DC converter designed to operate with very low input voltage amplitudes. Specific embodiments can operate with input voltages less than or equal to 1 V, less than or equal to 200 mV, and as low as 20 mV, respectively. Embodiments of the subject low-power AC/DC converter can be utilized in magnetic induction energy harvester systems. With reference to a specific embodiment, a maximum efficiency of 92% was achieved for a 1 V input, and efficiencies exceeding 70% were achieved for a 200 mV input. FIG. 7 shows, adjacent a penny, a top view of a printed circuit board on which an embodiment of the subject AC/DC converter resides. The circuit, which has a top surface area smaller than a penny, functioned properly when connected to a magnetic energy harvester device operating below 200 mV input.

Figure 1A:
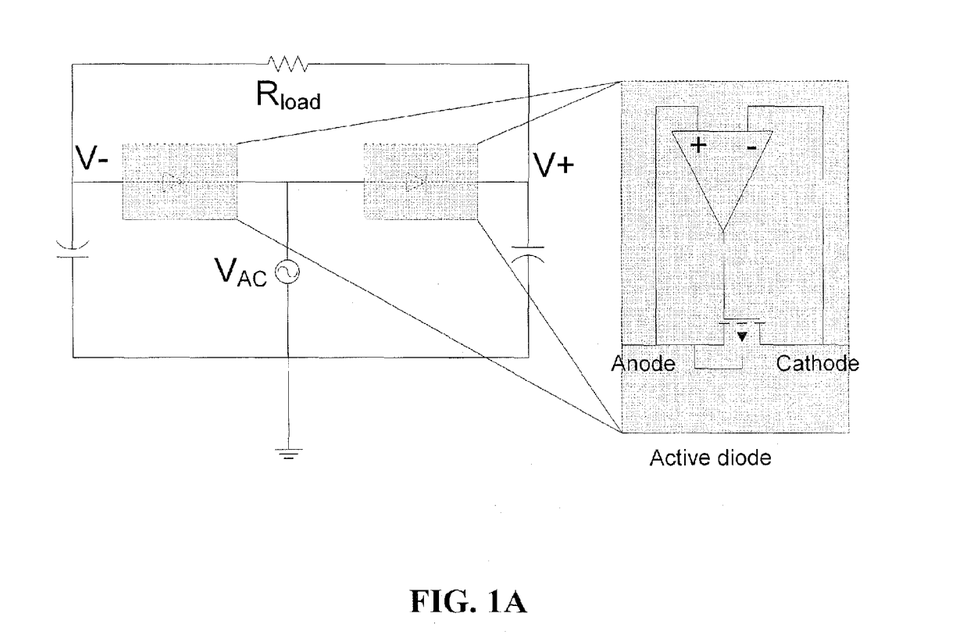
FIG. 1 shows the overall structure of a bridge voltage doubler rectifier with active diodes in accordance with an embodiment of the subject invention.
Figure 1B:
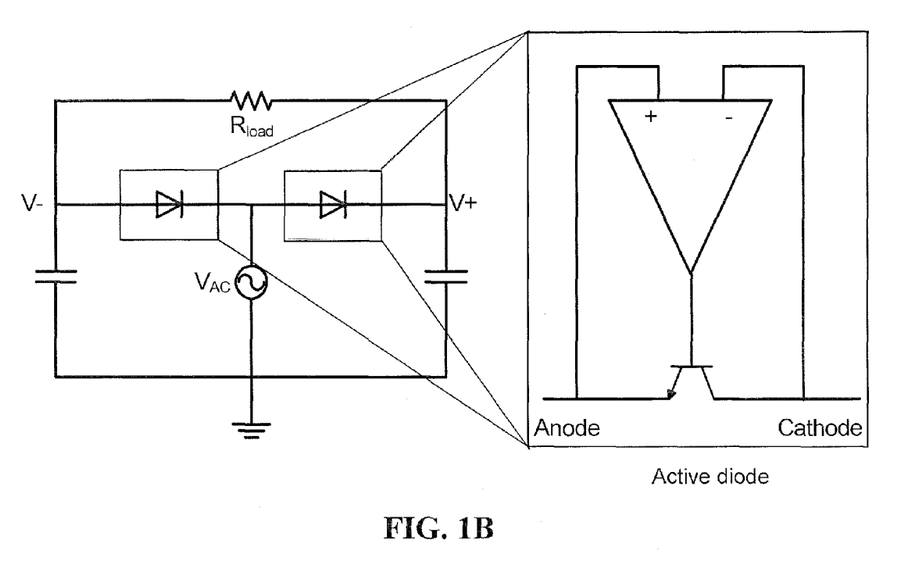

FIG. 1 shows a bridge voltage doubler circuit where the dc output voltage is twice the ac input amplitude. The circuit functions as two peak detectors, capturing the positive and negative peaks of the input voltage waveform. The load is connected across the positive and negative outputs of the peak detectors. To rectify low-voltage input waveforms, "active diodes", such as the active diodes described in C. Peter et al., Journal of Micromechanics and Microengineering, 18 (2008), pp. 104005-16, which is hereby incorporated by reference in its entirety for the teaching of active diodes that can be incorporated with embodiments of the subject invention, can be used in place of junction-based semiconductor diodes. The use of active diodes can, for example, mitigate forward-bias voltage drop. In a specific embodiment, each active diode can include a comparator and a transistor. The transistor can act as a switch. In a specific embodiment, a MOSFET transistor can be used in conjunction with a comparator to faint an active diode. Other types of transistors can be used as well. In a specific embodiment, the comparator and transistor can be configured to emulate an ideal diode. Referring to the blow up in FIG. 1, which shows an active diode having a comparator and a MOSFET, when the anode voltage, V+, is greater than cathode voltage, V−, the comparator outputs a positive voltage that turns on the MOSFET; otherwise, a negative comparator output voltage turns off the MOSFET. Other configurations can also be used. As an example, a comparator can be used where the output is a negative voltage when the anode input voltage is higher than the cathode input voltage of the comparator and a transistor is used that turns on with a negative voltage input from the comparator output and turns off with a positive voltage input from the comparator output. Other embodiments can use, for example, an inverter between the comparator output and the transistor, depending on the characteristics of the transistor used.

In the circuit implementation shown in FIG. 1, two nanopower comparators, such as two Maxim MAX9119's is used (MAX 9119 data sheet is provided in Table 2). In a specific embodiment, the two MAX 9119 comparators are powered by an external ±1 V supply, consuming 1~10 µW of power. The power consumption of the comparators was taken into account in the efficiency calculation. Discrete MOS chips were used, and moderately sized surface-mount storage capacitors (470 µf, ~10 mm³) were incorporated to reduce the ripple. The entire circuit was implemented on a PCB smaller than the size of a US penny, as shown in FIG. 7.

DETAILED DISCLOSURE

Embodiments of the subject invention relate to a method and apparatus for providing a low-power AC/DC converter designed to operate with very low input voltage amplitudes. Specific embodiments can operate with input voltages less than or equal to 1 V, less than or equal to 200 mV, and as low as 20 mV, respectively. Embodiments of the subject low-power AC/DC converter can be utilized in magnetic induction energy harvester systems. With reference to a specific embodiment, a maximum efficiency of 92% was achieved for a 1 V input, and efficiencies exceeding 70% were achieved for a 200 mV input. FIG. 7 shows, adjacent a penny, a top view of a two-sided printed circuit board on which an embodiment of the subject AC/DC converter, using discrete components resides. The circuit, which has a top surface area (1.54 cm²) smaller than a penny, functioned properly when connected to a magnetic energy harvester device operating below 200 mV input.

FIG. 1 shows a bridge voltage doubler circuit where the dc output voltage is twice the ac input amplitude. The circuit functions as two peak detectors, capturing the positive and negative peaks of the input voltage waveform. The load is connected across the positive and negative outputs of the peak detectors. To rectify low-voltage input waveforms, "active diodes", such as the active diodes described in C. Peter et al., Journal of Micromechanics and Microengineering, 18 (2008), pp. 104005-16, which is hereby incorporated by reference in its entirety for the teachings of active diodes that can be incorporated with embodiments of the subject invention, can be used in place of junction-based semiconductor diodes. The use of active diodes can, for example, mitigate forward-bias voltage drop and can allow the circuit to operate at low input voltages. In a specific embodiment, each active diode can include a comparator and a transistor. The transistor can act as a switch. In a specific embodiment, a MOSFET transistor can be used in conjunction with a comparator to form an active diode. Other types of transistors can also be utilized. In an embodiment, the comparator and transistor can be configured to emulate an ideal diode. Referring to the blow up in FIG. 1, which shows an active diode having a comparator and a MOSFET, when the anode voltage, V+, is greater than cathode voltage, V−, the comparator outputs a positive voltage that turns on the MOSFET; otherwise, a negative comparator output voltage turns off the MOSFET. Other configurations can also be used. As an example, a comparator can be used where the output is a negative voltage when the anode input voltage is higher than the cathode input voltage of the comparator and a transistor is used that turns on with a negative voltage input from the comparator output and turns off with a positive voltage input from the comparator output. Other embodiments can use, for example, an inverter between the comparator output and the transistor, depending on the characteristics of the transistor used.

In the circuit implementation shown in FIG. 1, two nanopower comparators, such as two Maxim MAX9119's is used (the MAX 9119 data sheet is provided in Table 2). The two MAX 9119 comparators are powered by an external ±1 V supply, consuming 1~10 µW of power. The power consumption of the comparators was taken into account in the efficiency calculation. Discrete MOS chips were used, and moderately sized surface-mount storage capacitors (470 µF, ~10 mm³) were incorporated to reduce the ripple. The entire circuit was implemented on a PCB smaller than the size of a US penny, as shown in FIG. 7.

Figure 8:
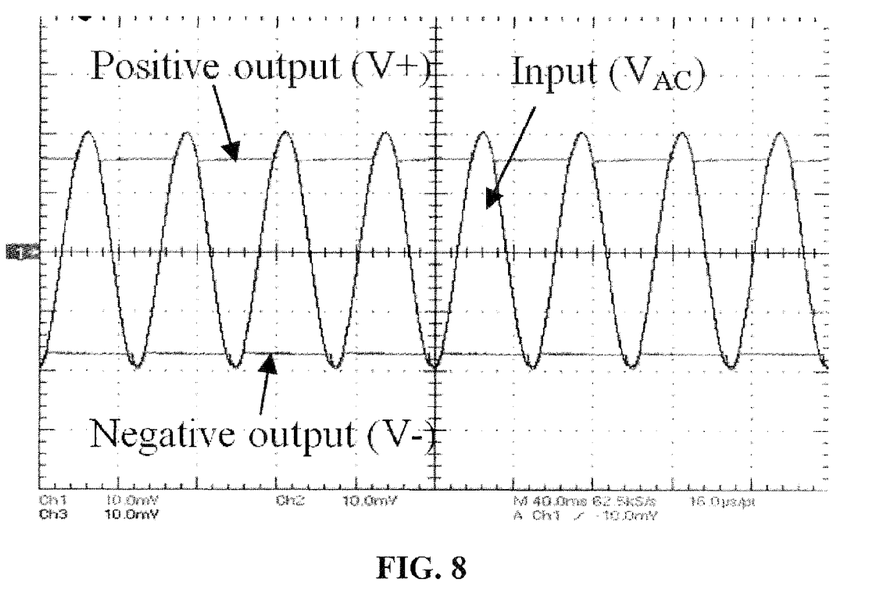
FIG. 8 shows open circuit waveforms for the converter shown in FIG. 1 with input amplitude of 20 mV.

To test the circuit, a 20 Hz sinusoidal input ranging from 0.02-1 $V_{pk}$ was used. The waveform was generated from an Agilent 33120A function generator, whose output impedance is 50Ω. This waveform can mimic the output characteristics of a typical low-frequency magnetic induction energy harvester. FIG. 8 shows the no-load input ($V_{AC}$) and output voltage waveforms (V+, V−) for a 20 mV peak-to-peak input voltage. The dc output voltage is about two times the input voltage amplitude, with some ripples. The ripple is reduced as the input voltage increases.

To test the low input voltage capability, the input voltage amplitude was gradually decreased, until the ripple exceeded 10%. To successfully rectify very low input voltages, the filter resistor should be large in order to maintain a detectable voltage for the comparator input. This comes at the expense of increased ripple. For R=100Ω and C=47 µF, an input voltage amplitude of only 20 mV was rectified, with a 10% ripple, as shown in FIG. 8. The same RC values were used throughout the test. In order to measure the power efficiency of the circuit, different load resistances were connected to the output. At different input voltage amplitudes, input and output power were measured. The average input power is given by, $$P_{in} = \frac{1}{T} \int_0^T [v_{in}(t)i_{in}(t) + v_{supply}(t)i_{supply}(t)] dt \quad (1)$$

where $v_{in}$ and $i_{in}$ are instantaneous input voltage and current, $v_{supply}$ and $i_{supply}$ are the instantaneous supply voltage and current to the comparators, and T is the duration of measurement, which is greater than 10 cycles.

Figure 9:
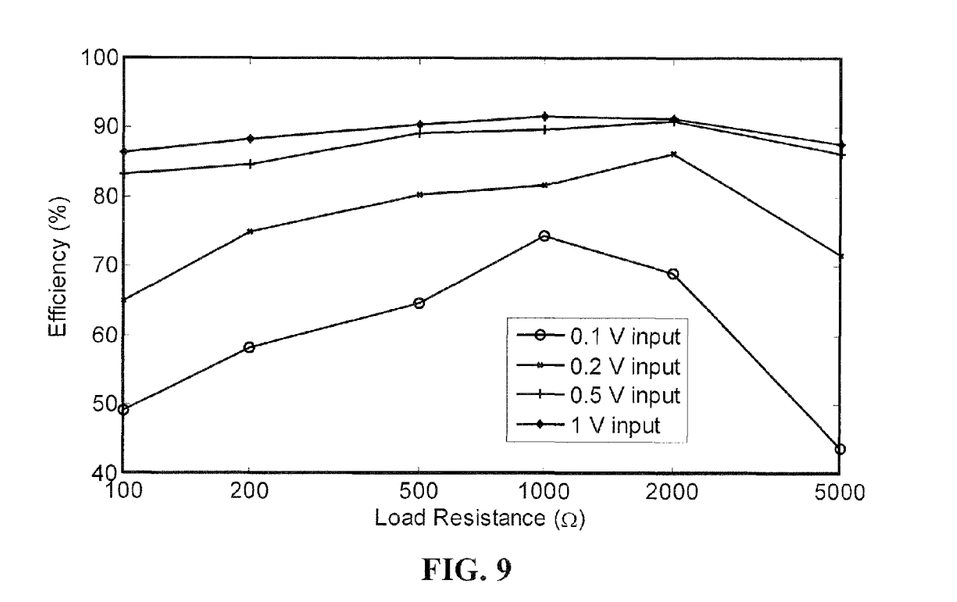
FIG. 9 shows a graph of efficiency vs. load resistance for different input voltage amplitudes with respect to the converter shown in FIG. 1.

The comparator supply voltages and currents are mostly dc. Therefore the power contribution of the power supply is approximately $V_{supply}*I_{supply}$. These were measured and supplied using two Keithley 2400 Sourcemeters. The input voltage is directly measured by an oscilloscope (Tektronix TDS5104B), whereas a 0.1Ω current-sensing resistor was connected in series at the input in order to measure the input current. The voltage across the current-sensing resistor was amplified by a low noise amplifier (SRS SR560). The efficiency and output power vs. load resistance curves for different input voltages are plotted in FIGS. 9 and 10, respectively. A maximum efficiency of 92% was observed at 1 V and 1 kΩ load. A maximum efficiency of 74% was obtained at 0.1 V. The output power was maximized for this embodiment at a slightly different resistive load (200Ω). The operational frequency range of the tested embodiment of the subject converter is from near dc to ~1 kHz, which covers the practical operating frequency of most vibrational energy harvesters.

Figure 10:
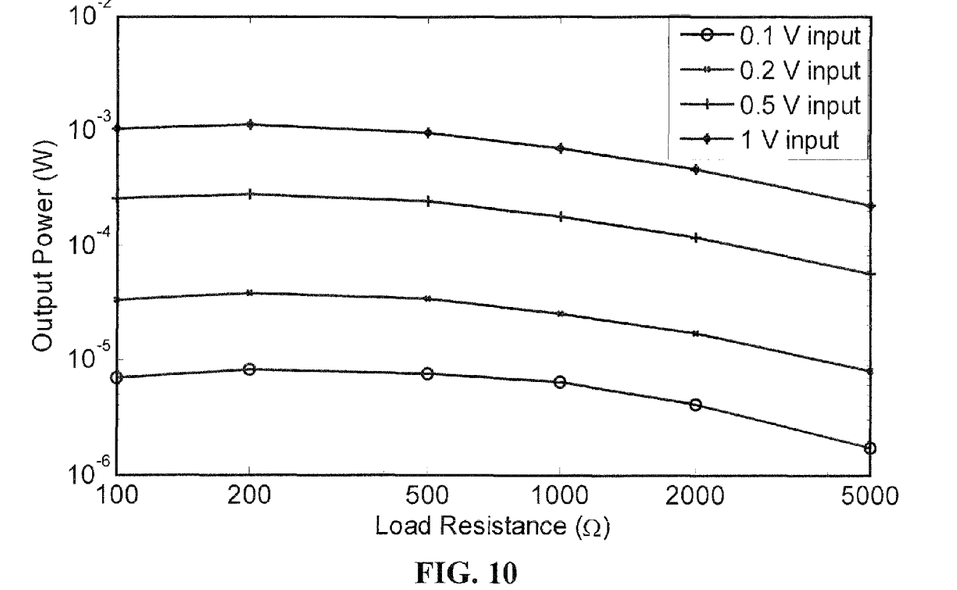
FIG. 10 shows a graph of output power vs. load resistance for different input voltage amplitudes with respect to the converter shown in FIG. 1.

While efficiency is important, the total output power may be more relevant for an energy harvesting system. FIG. 10 shows the output power increases with increasing input voltage as expected. The maximum output power was achieved around 200Ω regardless of input voltage amplitude. The equivalent output impedance of the rectifier is related to the load condition and the shape of the waveform. Based on the maximum power point, the circuit output impedance is estimated to be around 200Ω.

Figure 11:
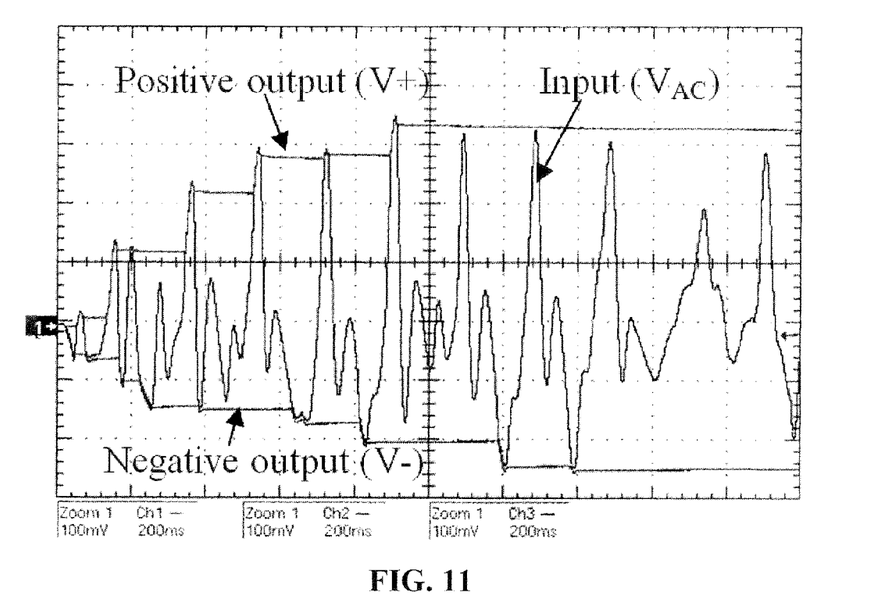
FIG. 11 shows open-circuit waveforms with an energy harvester as input with respect to the converter shown in FIG. 1.

A magnetic energy harvester was connected to the embodiment of the converter shown in FIG. 1, and the open-circuit (no loads) voltage waveforms are plotted in FIG. 11. The magnetic energy harvester is described in [Bowers, B. J. and Arnold, D. P. 2009, Spherical, rolling magnet generators for passive energy harvesting from human motion, *J. Micromech. Microeng.*, 19, 094008-14]. The harvester was shaken by hand, generating a randomized voltage waveform with amplitude <0.3V. The output precisely tracks the maximum and minimum input voltages with time. The charge is held in the capacitors when the output voltage is lower than the capacitor voltage. A slight decay is observed in the dc voltages, because of the finite input impedance of the oscilloscope, i.e., some charge is leaking off into the scope. The converter demonstrates low-input-voltage capability and high efficiency. In a specific embodiment, the few microwatts of external power required for the active diodes can be obtained from, for example, the energy storage unit, such as a battery or capacitor, the input voltage, the output voltage of the comparator, and/or from an external power source.

Embodiments of the subject invention, as shown in FIG. 1, can allow ac/dc rectification using a peak detector on each side of the input voltage, where each peak detector incorporates an active diode and a storage capacitor to convert an input ac voltage to a dc voltage. In a specific embodiment, the input ac voltage can come from an energy harvester and energy from the energy harvester can be stored in the storage capacitor or other energy storage element, such as a battery. Each active diode can include a comparator circuit and a switch where the comparator output is used to control the switch. A variety of switches can be used, including, but not limited to, an electromechanical switch, a bipolar junction transistor (BJT), a junction gate field-effect transistor (JFET), an analog switch, and a MOS transistor. In further specific embodiments, the MOS transistor can be an NMOS used on the positive side or a PMOS used on negative side, where the output of the comparator is connected to the gate of the NMOS or the PMOS, respectively. In a specific embodiment, the positive input of the comparator can be connected to the source of the NMOS or the drain of the PMOS. In another embodiment, the negative input of the comparator is connected to the drain of the NMOS or the source of the PMOS.

The comparator circuit can be powered by an external power source, by the energy storage element, by the input voltage, and/or the output of the comparator. When powered by the input voltage or the output of the comparator, the comparator circuit can be considered self-powered, as there are no external power connections.

Figure 2:
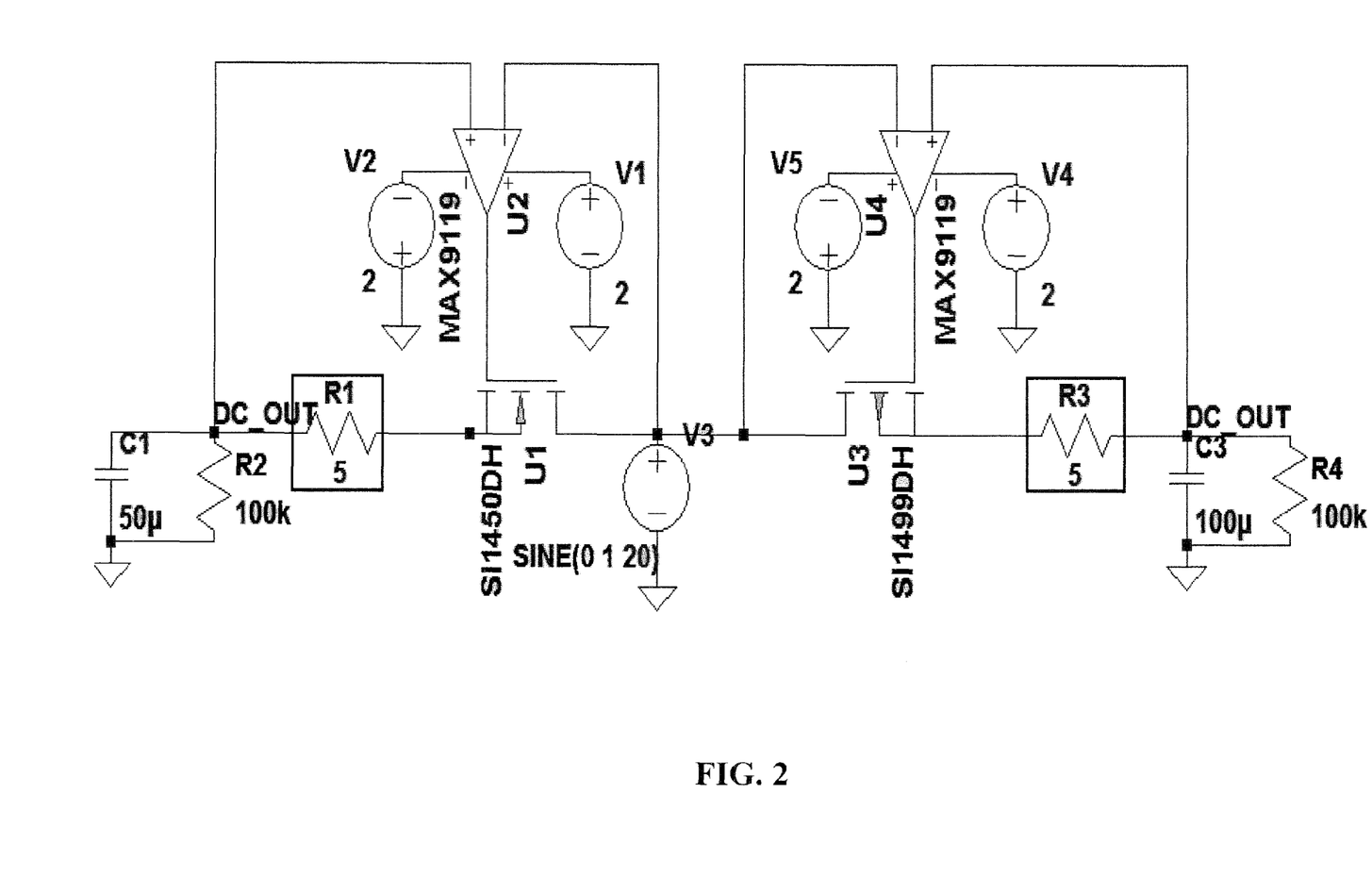
FIG. 2 shows the connection of the series resistor with the converter of FIG. 1 in accordance with an embodiment of the subject invention.
Figure 3A:
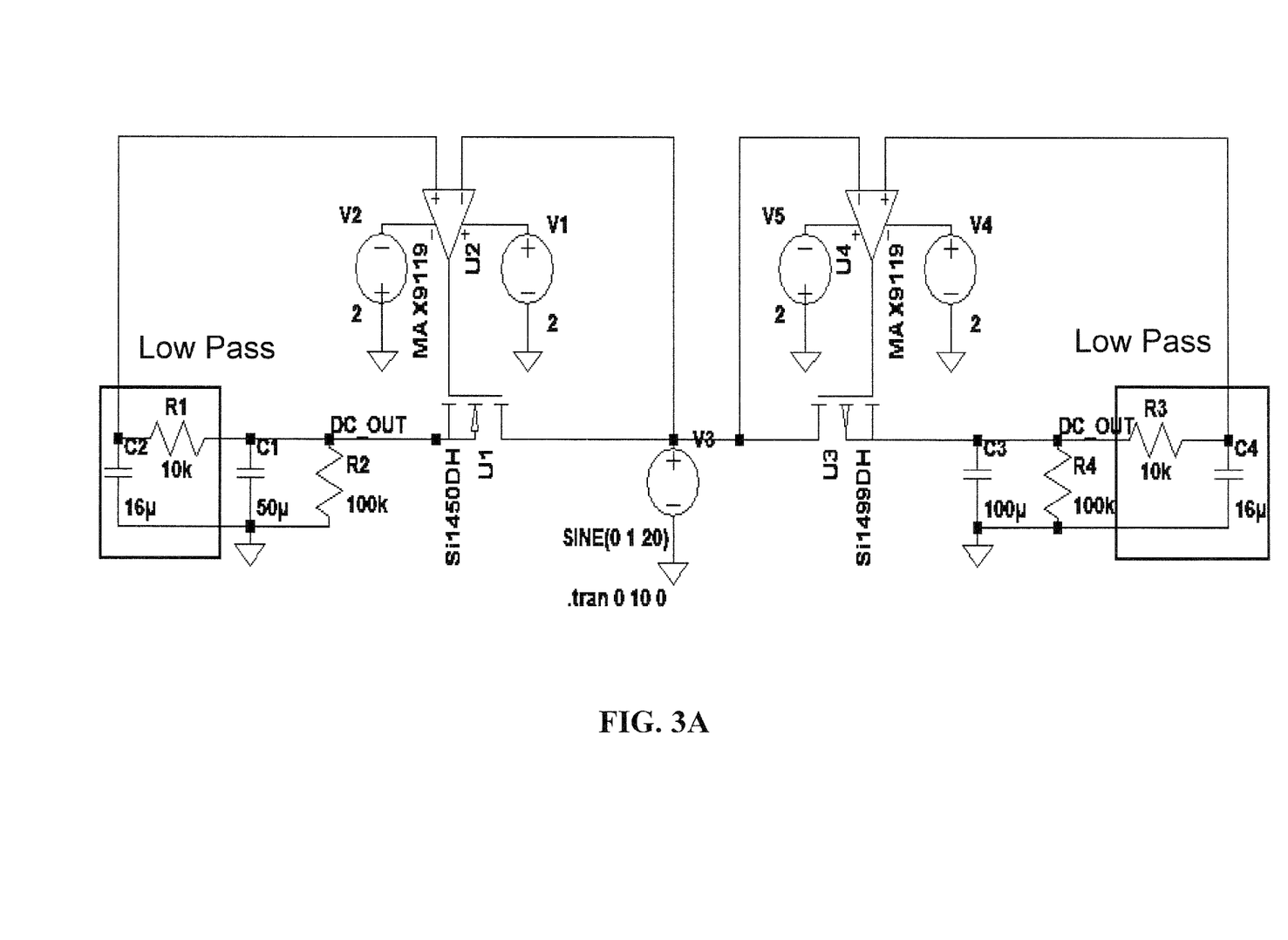
FIGS. 3A and 3B show the connection of the low pass filter with the converter of FIG. 1 in accordance with an embodiment of the subject invention.
Figure 3B:
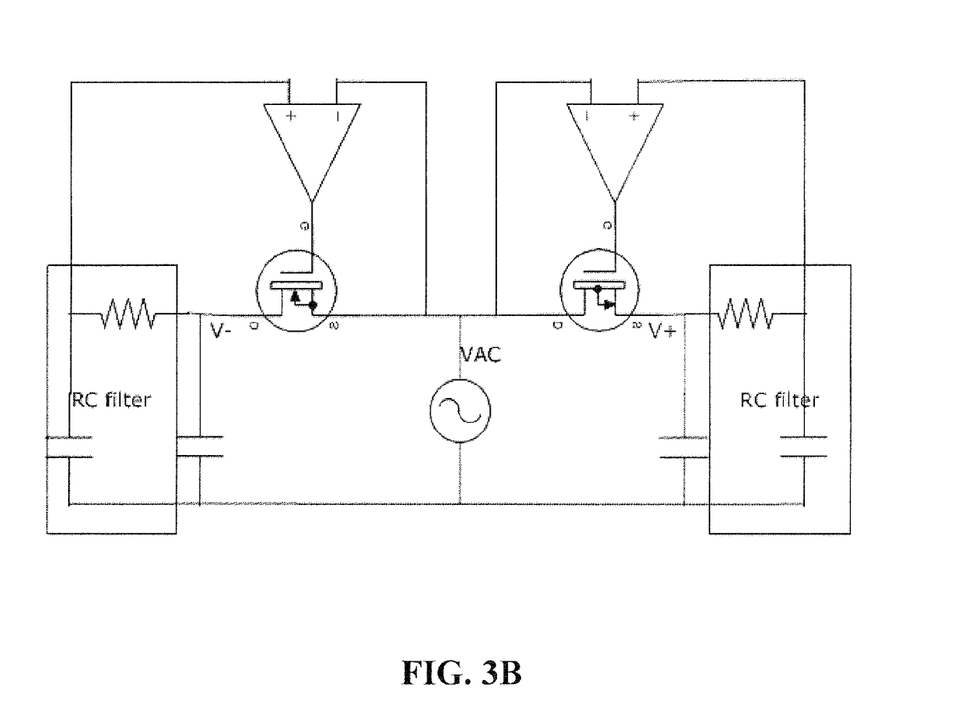

The circuit shown in FIG. 1 may not work as well when the load is too light (e.g., load impedance too high). The voltage across the MOSFET can be too low to be sensed by the comparator when the current flow is small. Accordingly, in specific embodiments, the active diode can be stabilized by, for example, using either a series resistor or a low pass filter. FIG. 2 shows the use of series resistors, R1 and R3, to stabilize the active diodes. By adding a resistor in series with the MOSFET so that the input voltage "seen" by the comparator is amplified. However, adding a series resistor may increase the conduction loss and reduce the efficiency. FIGS. 3A and 3B show the use of low pass filters, (R1 and C2) and (R3 and C4), to stabilize the active diodes. The comparator input voltage is the voltage across the MOSFET plus the filter resistor (R1, R3). Therefore, the comparator input voltage is larger so as to be detected more easily. Since the RC (low pass) filter is not part of the power flow path, little, or no, dc power is consumed by the filter resistor (R1, R3). However, because the feedback source is not the actual output, there can be some ripple with the output voltage, as shown in FIG. 8. The ripple can increase with increasing filter resistance.

Figure 4:
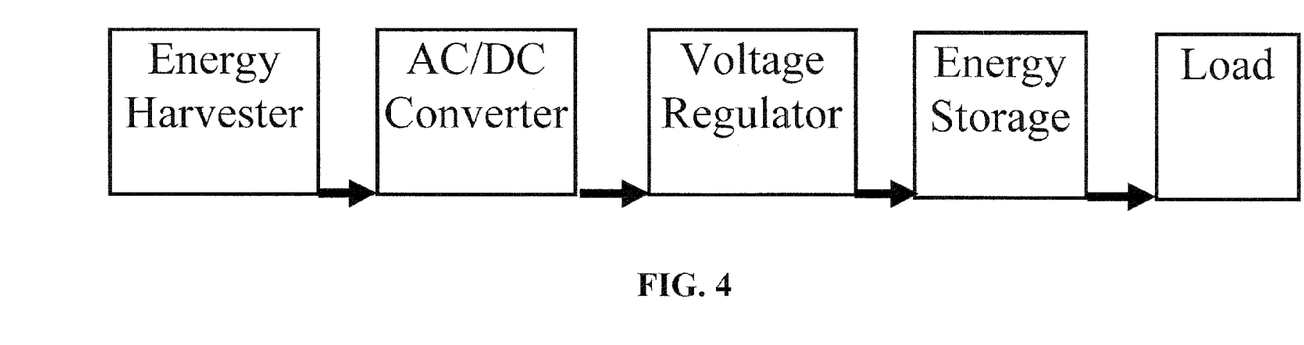
FIG. 4 shows a block diagram of a completed energy harvesting system in accordance with an embodiment of the subject invention.
Figure 5:
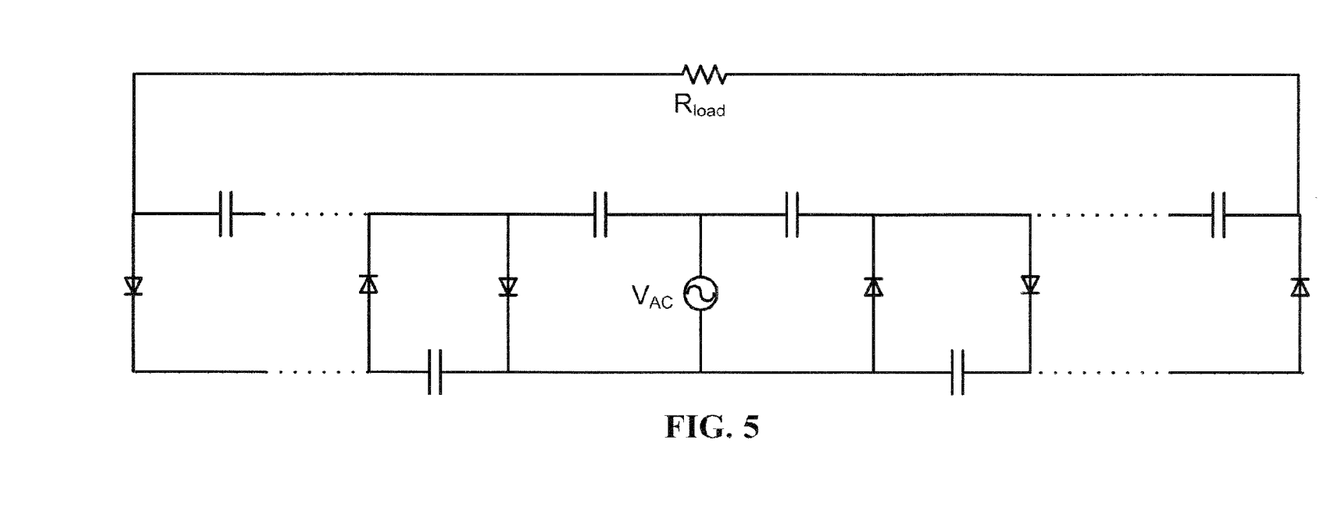
FIG. 5 shows a voltage quadrupler by laddering the circuit of FIG. 1 in accordance with an embodiment of the subject invention.

A shunt capacitor can be connected across the output terminals of the input voltage, such as from an energy harvester, to avoid resonant behavior. A linear or switching regulator can be connected to the output of the rectifier to regulate the voltage as shown in FIG. 4. The rectifier, such as the rectifier shown in FIG. 1, can be extended to a ladder circuit in order to boost the voltage. FIG. 5 shows a ladder that can quadruple the voltage. Additional stages can further boost the voltage, as much as eight times or more.

Figure 6:
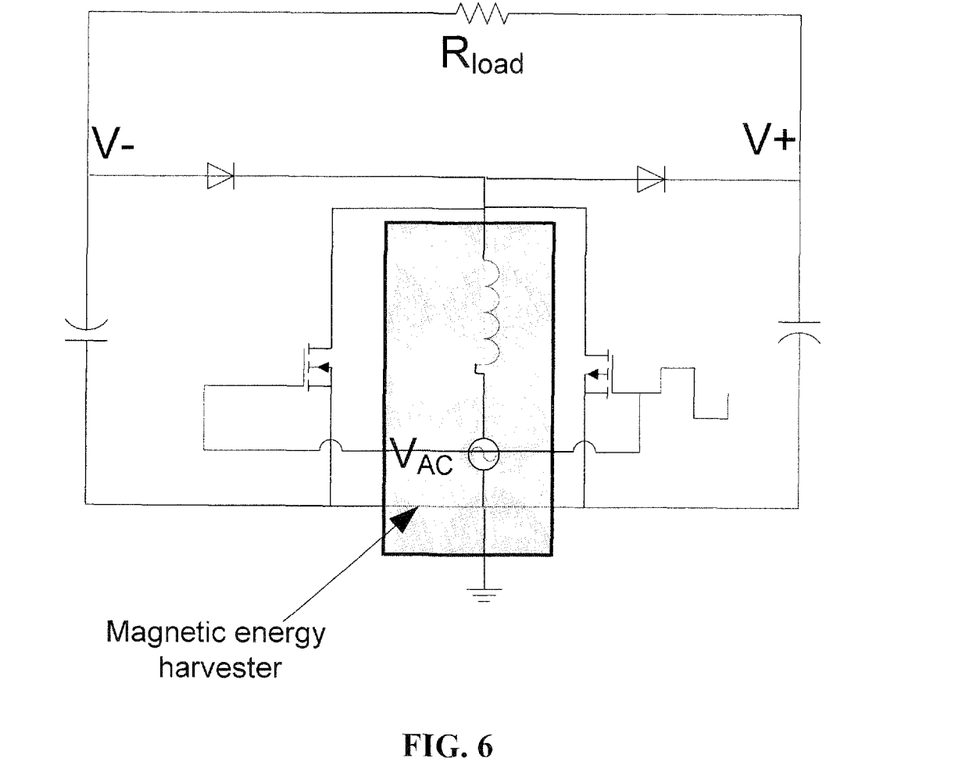
FIG. 6 shows a boost converter with an embedded inductor in accordance with an embodiment of the subject invention.

The rectifier can be extended to a boost converter by adding an NMOS and a PMOS across the output terminals of the input voltage source, such as a magnetic energy harvester, as shown in FIG. 6. A switching signal with a certain frequency can be connected to the gate of the NMOS or PMOS. In an embodiment, the switching frequency is much higher than the input frequency. The duty cycle of the switching signal can be controlled by a feedback network to stabilize the output voltage.

Since the input voltage from an energy harvesting system can be small, for example as low as 20 mV (or lower), an energy harvesting system utilizing a bridge voltage doubler circuit, as shown in FIG. 1, can have reduced need for other voltage boost stages.

The behavior of an ideal diode, or junction-based diode, can be described as an intelligently controlled switch, whose on/off state is determined by comparing the voltage across the terminals. When the anode voltage is higher than cathode, the switch turns on; otherwise it turns off. Active diode refers to a circuit implementation using active components to approximate the ideal behavior of an ideal diode. With respect to a specific active diode, the switch can be implemented by a MOSFET, whose source and drain terminals are connected to the input of a comparator, and the output of the comparator is connected to the gate terminal of the MOSFET.

Embodiments of the subject invention relate to energy harvesting systems incorporating active diodes. The use of active components (e.g., a comparator and a transistor such as a MOSFET) can introduce extra power consumption. However, by using state-of-the-art low-power integrated circuits, this power consumption can be much smaller than the power consumed in a typical junction-based diode. For example, the nanopower comparator MAX9119 by Maxim (used in the circuit shown in FIG. 7) has a minimum operation voltage of 1.6 V with supply current of 350 nA, yielding a quiescent power consumption of only 560 nW (see Table 2).

Comparing this to a typical Schottky diode with forward voltage of 0.3 V, the equivalent power is dissipated with a current flow of only 2 µA. Also, the forward-bias resistance of a Schottky diode is usually larger than the conducting resistance of a MOSFET that can be used with embodiments of the subject invention.

The bridge voltage doubler is a conventional circuit topology that was commonly used in cathode ray tube televisions to generate high dc voltages. The circuit functions as two peak detectors, capturing the positive and negative peaks of the input voltage waveform. The load is connected across the positive and negative outputs of the peak detectors, where the load voltage is twice the input ac voltage.

The operating state of a MOSFET is controlled by the differential voltage between the gate and source terminals. MOSFET types and comparator output ranges can be selected to enhance the performance of various embodiments of the invention. To reduce, or avoid, charge leakage through the body diode, the MOSFET can be connected in a way such that the body diode is oriented as shown in FIG. 1. Referring to FIG. 1, depending on whether an NMOS or PMOS transistor is used on each side of the doubler, the comparator output voltage should preferably meet certain characteristics, in order to properly turn on or turn off the MOSFETs. These preferred characteristics are summarized in Table 1.

TABLE 1

Comparator output voltage preferred characteristics for different types of MOSFETs used in the positive and negative sides of the doubler

| | NMOS | PMOS |
|---|---|---|
| Positive Side | $V_{pos}^* > V_{max}^* + V_{th}^*$<br>$V_{neg}^* < V_{min}^* + V_{th}$ | $V_{pos} > V_{max} - |V_{th}|$<br>$V_{neg} < -|V_{th}|$ |
| Negative Side | $V_{pos} > V_{th}$<br>$V_{neg} < V_{min} + V_{th}$ | $V_{pos} > V_{max} - |V_{th}|$<br>$V_{neg} < V_{min} - |V_{th}|$ |

*$V_{pos}$: positive output voltage of the comparator. $V_{neg}$: negative output voltage of the comparator. $V_{max}$: maximum input voltage. $V_{min}$: minimum input voltage. $V_{th}$: threshold voltage.

The comparator output voltage swing is determined in part by the supply voltages. For the MAX9119, the positive output is equal to the positive supply voltage minus 0.3 V, and the negative output voltage is the negative supply voltage plus 0.3 V (see Table 2). From Table 1, the supply voltage requirement is lowest when PMOS is used for positive side and NMOS is used for negative side. In the circuit shown in FIG. 7, Vishay SD1450DH ($V_{th}$=0.3 V) and SD1499DH ($V_{th}$=−0.35 V) were used as the NMOS and PMOS transistors, respectively. The comparators were supplied with +/−1 V.

ELECTRICAL CHARACTERISTICS - MAX9119/MAX9120 (without REF)
($V_{CC}$ = +5 V, $V_{EE}$ = 0 V, $V_{CM}$ = 0 V, $T_A$ = −40° C. to +85° C.,
unless otherwise noted. Typical values are at $T_A$ = +25° C.) (Note 1)

| PARAMETER | SYMBOL | CONDITIONS | | MIN | TYP | MAX | UNITS |
|---|---|---|---|---|---|---|---|
| Supply Voltage Range | $V_{CC}$ | Inferred from the PSRR test | $T_A$ = +25° C.<br>$T_A$ = $T_{MIN}$ to $T_{MAX}$ | 1.6<br>1.8 | | 5.5<br>5.5 | V |
| Supply Current | $I_{CC}$ | $V_{CC}$ = 1.6 V, $T_A$ = +25° C.<br>$V_{CC}$ = 5 V | $T_A$ = +25° C.<br>$T_A$ = $T_{MIN}$ to $T_{MAX}$ | | 0.35<br>0.45 | 0.80<br>0.80<br>1.2 | µA |
| Input Common-Mode Voltage Range | $V_{CM}$ | Inferred from the CMRR test | | $V_{EE}$ − 0.2 | | $V_{CC}$ + 0.2 | V |
| Input Offset Voltage | $V_{OS}$ | −0.2 V ≤ $V_{CM}$ ≤<br>($V_{CC}$ + 0.2 V) (Note 2) | $T_A$ = +25° C.<br>$T_A$ = $T_{MIN}$ to $T_{MAX}$ | | 1 | 5<br>10 | mV |
| Input-Referred Hysteresis | $V_{HB}$ | −0.2 V ≤ $V_{CM}$ ≤ ($V_{CC}$ + 0.2 V) (Note 3) | | | 4 | | mV |
| Input Bias Current | $I_B$ | $T_A$ = +25° C.<br>$T_A$ = $T_{MIN}$ to $T_{MAX}$ | | | 0.15 | 1<br>2 | nA |
| Input Offset Current | $I_{OS}$ | | | | 75 | | pA |
| Power-Supply Rejection Ratio | PSRR | $V_{CC}$ = 1.6 V to 5.5 V, $T_A$ = +25° C.<br>$V_{CC}$ = 1.8 V to 5.5 V, $T_A$ = $T_{MIN}$ to $T_{MAX}$ | | | 0.1 | 1<br>1 | mV/V |
| Common-Mode Rejection Ratio | CMRR | ($V_{EE}$ − 0.2 V) ≤ $V_{CM}$ ≤ ($V_{CC}$ + 0.2 V) | | | 0.5 | 3 | mV/V |
| Output Voltage Swing High | $V_{CC}$-$V_{OH}$ | MAX9119 only,<br>$V_{CC}$ = 5 V,<br>$I_{SOURCE}$ = 5 mA | $T_A$ = +25° C.<br>$T_A$ = $T_{MIN}$ to $T_{MAX}$ | | 190 | 400<br>500 | mV |
| | | MAX9119 only,<br>$I_{SOURCE}$ = 1 mA | $V_{CC}$ = 1.6 V,<br>$T_A$ = +25° C. | | 100 | 200 | |
| | | | $V_{CC}$ = 1.8 V,<br>$T_A$ = $T_{MIN}$ to $T_{MAX}$ | | | 300 | |
| Output Voltage Swing Low | $V_{OL}$ | $V_{CC}$ = 5 V,<br>$I_{SINK}$ = 5 mA | $T_A$ = +25° C.<br>$T_A$ = $T_{MIN}$ to $T_{MAX}$ | | 190 | 400<br>500 | mV |
| | | $I_{SINK}$ = 1 mA | $V_{CC}$ = 1.6 V,<br>$T_A$ = +25° C. | | 100 | 200 | |
| | | | $V_{CC}$ = 1.8 V,<br>$T_A$ = $T_{MIN}$ to $T_{MAX}$ | | | 300 | |
| Output Leakage Current | $I_{LEAK}$ | MAX9120 only, $V_O$ = 5.5 V | | | 0.001 | 1 | µA |
| Output Short-Circuit Current | $I_{SC}$ | Sourcing, $V_O$ = $V_{EE}$ | $V_{CC}$ = 5 V<br>$V_{CC}$ = 1.6 V | | 35<br>3 | | mA |

-continued

ELECTRICAL CHARACTERISTICS - MAX9119/MAX9120 (without REF)
($V_{CC}$ = +5 V, $V_{EE}$ = 0 V, $V_{CM}$ = 0 V, $T_A$ = −40° C. to +85° C.,
unless otherwise noted. Typical values are at $T_A$ = +25° C.) (Note 1)

| PARAMETER | SYMBOL | CONDITIONS | | MIN | TYP | MAX | UNITS |
|---|---|---|---|---|---|---|---|
| | | Sourcing, $V_O$ = $V_{CC}$ | $V_{CC}$ = 5 V | | 35 | | |
| | | | $V_{CC}$ = 1.6 V | | 3 | | |
| High-to-Low Propagation Delay (Note 4) | $t_{PD-}$ | | $V_{CC}$ = 1.6 V | | 16 | | µs |
| | | | $V_{CC}$ = 5 V | | 14 | | |
| Low-to-High Propagation Delay (Note 4) | $t_{PD+}$ | MAX9119 only | $V_{CC}$ = 1.6 V | | 15 | | µs |
| | | | $V_{CC}$ = 5 V | | 40 | | |
| | | MAX9120 only | $V_{CC}$ = 1.6 V, $R_{PULLUP}$ = 100 kΩ | | 16 | | |
| | | | $V_{CC}$ = 5 V, $R_{PULLUP}$ = 100 kΩ | | 45 | | |
| Rise Time | $t_{RISE}$ | MAX9119 only, $C_L$ = 15 pF | | | 1.6 | | µs |
| Fall Time | $t_{FALL}$ | $C_L$ = 15 pF | | | 0.2 | | µs |
| Power-Up Time | $t_{ON}$ | | | | 1.2 | | ms |

(Note 1): All specifications are 100% tested at $T_A$ = +25° C. Specification limits over temperature ($T_A$ = $T_{MIN}$ to $T_{MAX}$) are guaranteed by design, not production tested.
(Note 2): $V_{OS}$ is defined as the center of the hysteresis band at the input.
(Note 3): The hysteresis-related trip points are defines as the edges of the hysteresis band, measured with respect to the center of the band (i.e., $V_{OS}$) (FIG. 2).
(Note 4): Specified with an input overdrive ($V_{OVERDRIVE}$) of 100 mV, and load capacitance of $C_L$ = 15 pF. $V_{OVERDRIVE}$ is defined above and beyond the offset voltage and hysteresis of the comparator input. For the MAX9117/MAX9118, reference voltage error should also be added.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. An AC/DC converter, comprising:
a first active diode;
a second active diode;
a first energy storage element; and
a second energy storage element;
wherein the converter is adapted to connect to an input AC voltage source such that the first active diode is in series between the input AC voltage source and the first energy storage element and the second active diode is in series between the input AC voltage source and the second energy storage element, such that when a voltage of the input AC voltage source is below a voltage of the first energy storage element, the first active diode turns on and current flows from the first energy storage element to the input AC voltage source, and when the voltage of the input AC voltage source is higher than a voltage of the second energy storage element, current flows from the input AC voltage source to the second energy storage element;
wherein the first active diode comprises a first comparator and a first switch,
wherein the second active diode comprises a second comparator and a second switch
wherein the first comparator comprises a first positive input port, a first negative input port, at least one first bias port, and a first output port;
wherein the first switch comprises a first transistor, where the first transistor has a first gate, a first drain, and a first source;
wherein the second comparator comprises a second positive input port, a second negative input port, at least one second bias port, and a second output port;
wherein the second switch comprises a second transistor, wherein the second transistor comprises a second gate, a second drain, and a second source,
wherein the converter further comprises:
at least one first bias voltage supply; and
at least one second bias voltage supply;
wherein the at least one first bias voltage supply is connected to the at least one first bias port so as to provide a first bias voltage to the first comparator, wherein the first output port is connected to the first gate, wherein one of the first positive input port and the first negative input port is connected to the first energy storage element, wherein the other of the first positive input port and the first negative input port is adapted to connect to the input AC voltage source, wherein one of the first drain and the first source is adapted to connect to the input AC voltage source and the other of the first drain and first source is connected with the first energy storage element such that the first transistor is in series between the input AC voltage source and the first energy storage element, wherein when the voltage of the input AC voltage source is below the voltage of the first energy storage element a voltage of the first output port turns on the first transistor and current flows from the first energy storage element to the input AC voltage source,
wherein the at least one second bias voltage supply is connected to the at least one second bias port so as to provide a second bias voltage to the second comparator, wherein the second output port is connected to the second gate, wherein one of the second positive input port and the second negative input port is connected to the second energy storage element, wherein the other of the second positive input port and the second negative input port is adapted to connect to the input AC voltage source, wherein one of the second drain and the second source is adapted to connect to the input AC voltage source and the other of the second drain and the second source is connected to the second energy storage element such that the second transistor is in series between the input AC voltage source and the second energy storage element, wherein when the voltage of the input AC voltage source is above the voltage of the second energy storage element the second output port voltage turns on the second transistor and current flows from the input AC voltage source to the second energy storage element.

2. The converter according to claim 1,
wherein the at least one first bias voltage supply comprises a first positive bias voltage supply and a first negative bias voltage supply, wherein the first positive bias voltage supply is connected to the first positive bias port, wherein the first negative bias voltage supply is connected to the first negative bias port,
wherein the at least one second bias voltage supply comprises a second positive bias voltage supply and a second negative bias voltage supply, wherein the second positive bias voltage supply is connected to the second positive bias port, wherein the second negative bias voltage supply is connected to the second negative bias port.

3. The converter according to claim 1, wherein the first positive input port is connected to the first energy storage element, wherein the first negative input port is adapted to connect to the input AC voltage source.

4. The converter according to claim 1, wherein the first negative input port is connected to the first energy storage element, wherein the first positive input port is adapted to connect to the input AC voltage source.

5. The converter according to claim 1, wherein the first drain is adapted to connect to the input AC voltage source, wherein the first source is connected to the first energy storage element.

6. The converter according to claim 1, wherein the first source is adapted to connect to the input AC voltage source, wherein the first drain is connected to the first energy storage element.

7. The converter according to claim 1, wherein the second positive input port is connected to the second energy storage element, wherein the second negative input port is adapted to connect to the input AC voltage source.

8. The converter according to claim 1, wherein the second negative input port is connected to the second energy storage element, wherein the second positive input port is adapted to connect to the input AC voltage source.

9. The converter according to claim 1, wherein the second drain is adapted to connect to the input AC voltage source, wherein the second source is connected to the second energy storage element.

10. The converter according to claim 1, wherein the second source is adapted to connect to the input AC voltage source, wherein the second drain is connected to the second energy storage element.

11. The converter according to claim 1, wherein the converter operates with an input AC voltage source of less than or equal to 1 V.

12. The converter according to claim 1, wherein the first switch is a first transistor, wherein the second switch is a second transistor.

13. The converter according to claim 12, wherein the first and second transistors are junction gate field-effect transistor (JFET).

14. The converter according to claim 12, wherein the first and second transistors are MOS transistors.

15. The converter according to claim 14, further comprising a first low pass filter in parallel with the first energy storage element.

16. The converter according to claim 12, wherein the second transistor is an NMOS transistor and the first transistor is a PMOS transistor.

17. The converter according to claim 16, wherein the second comparator comprises a second positive input port connected to a source of the NMOS transistor.

18. The converter according to claim 17, wherein the second comparator comprises a second negative input port connected to a drain of the NMOS transistor.

19. The converter according to claim 16, wherein the first comparator comprises a first positive input port connected to a drain of the PMOS transistor.

20. The converter according to claim 19, wherein the first comparator comprises a first negative input port connected to a source of the PMOS transistor.

21. The converter according to claim 1, further comprising a first resistor in series with the first active diode between the input AC power source and the first energy storage element.

22. The converter according to claim 1, further comprising a shunt capacitor connected across output terminals of the input AC power source.

23. The converter according to claim 1, further comprising a linear or switching regulator connected to an output of the converter.

24. The converter according to claim 1, wherein the converter operates with an input AC power source of less than or equal to 200 mV.

25. The converter according to claim 24, wherein the converter has an efficiency greater than 70%.

26. The converter according to claim 1, wherein the converter operates with an input AC power source of less than or equal to 20 mV.

27. A magnetic induction energy harvester system, comprising an AC/DC converter, wherein the AC/DC converter comprises:
a first active diode;
a second active diode;
a first energy storage element; and
a second energy storage element;
wherein the converter is adapted to connect to an input AC voltage source such that the first active diode is in series between the input AC voltage source and the first energy storage element and the second active diode is in series between the input AC voltage source and the second energy storage element, such that when a voltage of the input AC voltage source is below a voltage of the first energy storage element, the first active diode turns on and current flows from the first energy storage element to the input AC voltage source, and when the voltage of the input AC voltage source is higher than a voltage of the second energy storage element, current flows from the input AC voltage source to the second energy storage element,
wherein the first active diode comprises a first comparator and a first switch,
wherein the second active diode comprises a second comparator and a second switch,
wherein the first comparator comprises a first positive input port, a first negative input port, at least one first bias port, and a first output port;
wherein the first switch comprises a first transistor, where the first transistor has a first gate, a first drain, and a first source;
wherein the second comparator comprises a second positive input port, a second negative input port, at least one second bias port, and a second output port;
wherein the second switch comprises a second transistor, wherein the second transistor comprises a second gate, a second drain, and a second source,
wherein the converter further comprises:
at least one first bias voltage supply; and
at least one second bias voltage supply;

wherein the at least one first bias voltage supply is connected to the at least one first bias port so as to provide a first bias voltage to the first comparator, wherein the first output port is connected to the first gate, wherein one of the first positive input port and the first negative input port is connected to the first energy storage element, wherein the other of the first positive input port and the first negative input port is adapted to connect to the input AC voltage source, wherein one of the first drain and the first source is adapted to connect to the input AC voltage source and the other of the first drain and first source is connected with the first energy storage element such that the first transistor is in series between the input AC voltage source and the first energy storage element, wherein when the voltage of the input AC voltage source is below the voltage of the first energy storage element a voltage of the first output port turns on the first transistor and current flows from the first energy storage element to the input AC voltage source, wherein the at least one second bias voltage supply is connected to the at least one second bias port so as to provide a second bias voltage to the second comparator, wherein the second output port is connected to the second gate, wherein one of the second positive input port and the second negative input port is connected to the second energy storage element, wherein the other of the second positive input port and the second negative input port is adapted to connect to the input AC voltage source, wherein one of the second drain and the second source is adapted to connect to the input AC voltage source and the other of the second drain and the second source is connected to the second energy storage element such that the second transistor is in series between the input AC voltage source and the second energy storage element, wherein when the voltage of the input AC voltage source is above the voltage of the second energy storage element the second output port voltage turns on the second transistor and current flows from the input AC voltage source to the second energy storage element.

28. The magnetic induction energy harvester system according to claim 27, wherein the converter operates with an input AC voltage source of less than or equal to 1 V.

29. The magnetic induction energy harvester system according to claim 27,
wherein the at least one first bias voltage supply comprises a first positive bias voltage supply and a first negative bias voltage supply, wherein the first positive bias voltage supply is connected to the first positive bias port, wherein the first negative bias voltage supply is connected to the first negative bias port,
wherein the at least one second bias voltage supply comprises a second positive bias voltage supply and a second negative bias voltage supply, wherein the second positive bias voltage supply is connected to the second positive bias port, wherein the second negative bias voltage supply is connected to the second negative bias port.

30. The magnetic induction energy harvester system according to claim 27, wherein the first positive input port is connected to the first energy storage element, wherein the first negative input port is adapted to connect to the input AC voltage source.

31. The magnetic induction energy harvester system according to claim 27, wherein the first negative input port is connected to the first energy storage element, wherein the first positive input port is adapted to connect to the input AC voltage source.

32. The magnetic induction energy harvester system according to claim 27, wherein the first drain is adapted to connect to the input AC voltage source, wherein the first source is connected to the first energy storage element.

33. The magnetic induction energy harvester system according to claim 27, wherein the first source is adapted to connect to the input AC voltage source, wherein the first drain is connected to the first energy storage element.

34. The magnetic induction energy harvester system according to claim 27, wherein the second positive input port is connected to the second energy storage element, wherein the second negative input port is adapted to connect to the input AC voltage source.

35. The magnetic induction energy harvester system according to claim 27, wherein the second negative input port is connected to the second energy storage element, wherein the second positive input port is adapted to connect to the input AC voltage source.

36. The magnetic induction energy harvester system according to claim 27, wherein the second drain is adapted to connect to the input AC voltage source, wherein the second source is connected to the second energy storage element.

37. The magnetic induction energy harvester system according to claim 27, wherein the second source is adapted to connect to the input AC voltage source, wherein the second drain is connected to the second energy storage element.

38. The converter according to claim 27, wherein the first switch is a first transistor, wherein the second switch is a second transistor.

39. The converter according to claim 38, wherein the first and second transistors are junction gate field-effect transistor (JFET).

40. The converter according to claim 38, wherein the first and second transistors are MOS transistors.

41. The converter according to claim 40, further comprising a first low pass filter in parallel with the first energy storage element.

42. The converter according to claim 38, wherein the second transistor is an NMOS transistor and the first transistor is a PMOS transistor.

43. The converter according to claim 42, wherein the second comparator comprises a second positive input port connected to a source of the NMOS transistor.

44. The converter according to claim 43, wherein the second comparator comprises a second negative input port connected to a drain of the NMOS transistor.

45. The converter according to claim 42, wherein the first comparator comprises a first positive input port connected to a drain of the PMOS transistor.

46. The converter according to claim 45, wherein the first comparator comprises a first negative input port connected to a source of the PMOS transistor.

47. The converter according to claim 27, further comprising a first resistor in series with the first active diode between the input AC power source and the first energy storage element.

48. The converter according to claim 27, further comprising a shunt capacitor connected across output terminals of the input AC power source.

49. The converter according to claim 27, further comprising a linear or switching regulator connected to an output of the converter.

50. The converter according to claim 27, wherein the converter operates with an input AC power source of less than or equal to 200 mV.

51. The converter according to claim 50, wherein the converter has an efficiency greater than 70%.

52. The converter according to claim 27, wherein the converter operates with an input AC power source of less than or equal to 20 mV.

* * * * *

UNITED STATES PATENT AND TRADEMARK OFFICE
CERTIFICATE OF CORRECTION

| | | |
|---|---|---|
| PATENT NO. | : 8,743,577 B2 | Page 1 of 1 |
| APPLICATION NO. | : 12/950564 | |
| DATED | : June 3, 2014 | |
| INVENTOR(S) | : Cheng et al. | |

It is certified that error appears in the above-identified patent and that said Letters Patent is hereby corrected as shown below:

In the Specification

Column 2,
Lines 46-47, "faint an active diode." should read --form an active diode.--.

Column 9 & 10,
Line 18, Note 3, "trip points are defines as" should read --trip points are defined as--.

Signed and Sealed this
Twenty-third Day of September, 2014

Michelle K. Lee
*Deputy Director of the United States Patent and Trademark Office*